UNITED STATES PATENT OFFICE.

HEINRICH LAUBMANN, OF HÖCHST-ON-THE-MAIN, GERMANY, ASSIGNOR TO THE FARBWERKE, VORMALS MEISTER, LUCIUS & BRÜNING, OF SAME PLACE.

OXYANTHRAQUINONE DISULFONIC ACID AND PROCESS OF MAKING SAME.

SPECIFICATION forming part of Letters Patent No. 648,271, dated April 24, 1900.

Application filed October 10, 1898. Serial No. 693,089. (Specimens.)

*To all whom it may concern:*

Be it known that I, HEINRICH LAUBMANN, Ph. D., a subject of the Emperor of Germany, residing at Höchst-on-the-Main, Germany, have invented certain new and useful Improvements in the Manufacture of Penta and Hexa Oxyanthraquinone Disulfonic Acids, of which the following is a specification.

In my patent application, Serial No. 677,346, filed April 12, 1898, are described two new isomeric tetraoxyanthraquinone-disulfonic acids derived from two new isomeric tetraoxyanthraquinones and obtained by the action of gentle oxidizing agents upon diamidodisulfoanthraflavic acid and diamidodisulfoisoanthraflavic acid. While the only hitherto-known tetraoxyanthraquinonedisulfonic acid—that is to say, the anthrachrysone disulfonic acid—is not changed in concentrated sulfuric-acid solution by oxidizing agents—such, for instance, as manganese dioxid—and is easily transformed by nitric acid into dinitroanthrachrysonedisulfonic acid, both the new tetraoxyanthraquinonedisulfonic acids behave differently. If these sulfonic acids be treated with an oxidizing agent—for instance, manganese dioxid or nitric acid—then they are oxidized, as I have found, into new pentaoxyanthraquinonedisulfonic acids. The pentaoxyanthraquinones, which serve as bases to the new sulfonic acids, are also new and are not identical with the pentaoxyanthraquinones hitherto known.

The new pentaoxyanthraquinonedisulfonic acid is a valuable blue mordant dyestuff. Its constitution is represented by the formula:

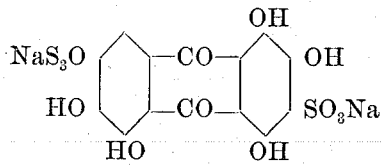

The following examples illustrate the process:

Example I: Tetraoxyanthraquinonedisulfonic acid from anthraflavic acid is dissolved in form of its acid potassium salt in ten to twenty times its quantity in weight of sulfuric acid of 66° Baumé, and to the well-cooled solution is slowly run in with active stirring somewhat more than the quantity corresponding to one molecule of finely-ground manganese dioxid.

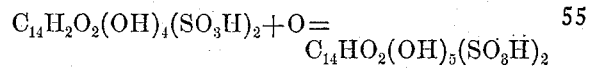

After a short time the reaction begins, the mixture becoming a clear intense blue. To complete the reaction, the mass is stirred for some hours and cooled at the same time, then further stirred for from twelve to twenty-four hours at ordinary temperature, poured into a sufficient quantity of water, and boiled after having added, if required, some solution of a bisulfite. From the filtered pure-red solution the acid potassium salt of pentaoxyanthraquinonedisulfonic acid is separated by potassium chlorid and may again be purified by recrystallization. With the same result nitric acid may be used as oxidizing agent by adding to the concentrated sulfuric-acid solution of tetraoxyanthraquinonedisulfonic acid one molecule of nitric acid either as the acid itself or as a suitable nitrate under the conditions above set forth. The course of the reaction is the same.

The product is soluble with some difficulty in cold water, more easily in hot water with a red color, which, on addition of ammonia and soda, becomes a more intense red and red violet on addition of fixed alkalies. An excess of alkali precipitates the sulfonic acid in red flakes. In concentrated sulfuric acid the sulfonic acid is soluble with a red-violet color. The solution exhibits a red fluorescence.

The pentaoxyanthraquinonedisulfonic acid dyes wool red in an acid-bath. The acid dye, subsequently treated with chromium fluorid, produces a pure blue fast to milling.

Example II: Under exactly the same conditions the tetraoxyanthraquinonedisulfonic acid from isoanthraflavic acid may be transformed by the same oxidizing agents into one of the above-described isomeric pentaoxyanthraquinonedisulfonic acids. Its manufacture is carried out under the conditions set forth in Example I. In order to isolate the new compound, the violet mixture is in this case also poured into water, boiled, salted out with potassium chlorid, and the product to be purified is precipitated from its aqueous solutions by an excess of fixed alkali and retransformed into the acid potassium salt.

The pure product is a red crystalline powder easily soluble in hot water with a red solution, becoming violet on addition of alkali. An excess of alkali precipitates the alkali salt from the aqueous solution in violet-blue crystalline flakes. Concentrated sulfuric acid dissolves the sulfonic acid with a red color. The concentrated solution exhibits a red fluorescence.

The red dye of the new pentaoxyanthraquinonedisulfonic acid upon wool in an acid-bath produces on subsequent treatment with chromium fluorid a blue fast to milling and light; but its tint is of a somewhat-redder hue than that obtained from pentaoxyanthraquinonedisulfonic acid derived from anthraflavic acid.

Having now described my invention, what I claim is—

1. The herein-described process of manufacturing new pentaoxyanthraquinonedisulfonic acids, which consists in treating the tetraoxyanthraquinonedisulfonic acids dissolved in concentrated sulfuric acid, with the calculated quantity of an oxidizing agent for the introduction of a hydroxyl group, substantially as set forth.

2. As a new product, the pentaoxyanthraquinonedisulfonic acid of the following constitution:

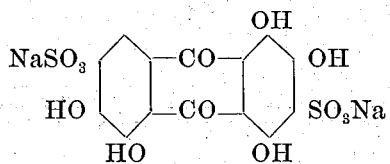

obtained from the herein-described tetraoxyanthraquinonedisulfonic acid, which in the form of its acid salt of an alkali metal is a red crystalline powder, this salt being soluble with difficulty in cold, more easily soluble in hot water with a red color, the aqueous solution turning bluish red on addition of ammonia or dilute soda solution, and red violet on addition of fixed alkalies, and is precipitated in red flakes by an excess of alkali, soluble in concentrated sulfuric acid with a bluish-red color, dyeing wool in an acid-bath red, the said dye yielding on subsequent treatment with chromium fluorid pure-blue tints fast to milling, substantially as set forth.

In testimony that I claim the foregoing as my invention I have signed my name in presence of two subscribing witnesses.

HEINRICH LAUBMANN.

Witnesses:
ALFRED BRISBOIS,
WILHELM SCHAAB.